Figures 1, 2:
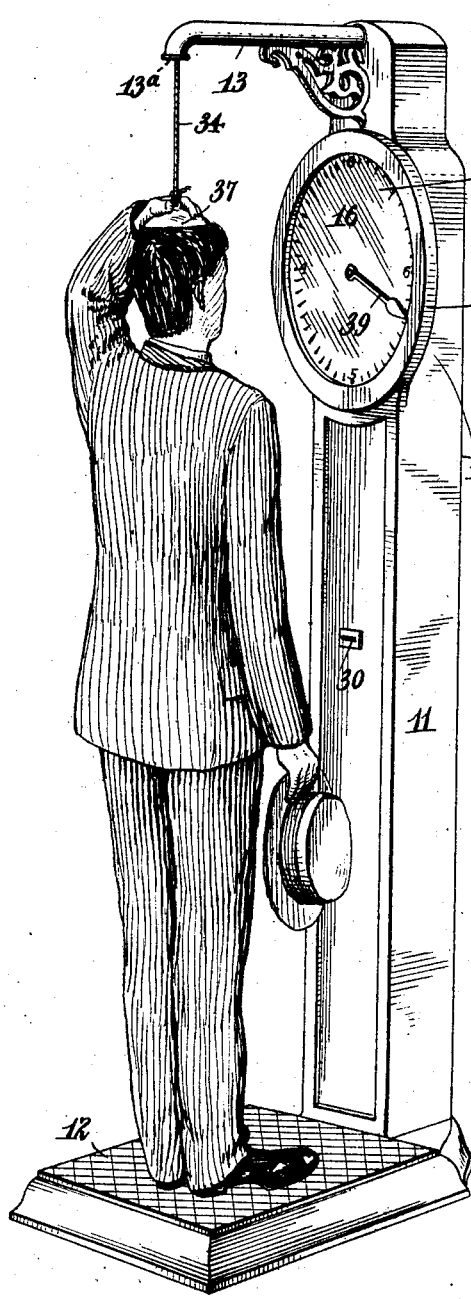

No. 833,124. PATENTED OCT. 9, 1906.
S. P. COTTRELL.
MACHINE FOR MEASURING THE HEIGHT OF PERSONS.
APPLICATION FILED JAN. 30, 1905.

2 SHEETS—SHEET 1.

Witnesses:
Julius Lankes
Harry Harris

Sylvester P. Cottrell, Inventor
By Emil Neuhart
Attorney

No. 833,124. PATENTED OCT. 9, 1906.
S. P. COTTRELL.
MACHINE FOR MEASURING THE HEIGHT OF PERSONS.
APPLICATION FILED JAN. 30, 1905.
2 SHEETS—SHEET 2.
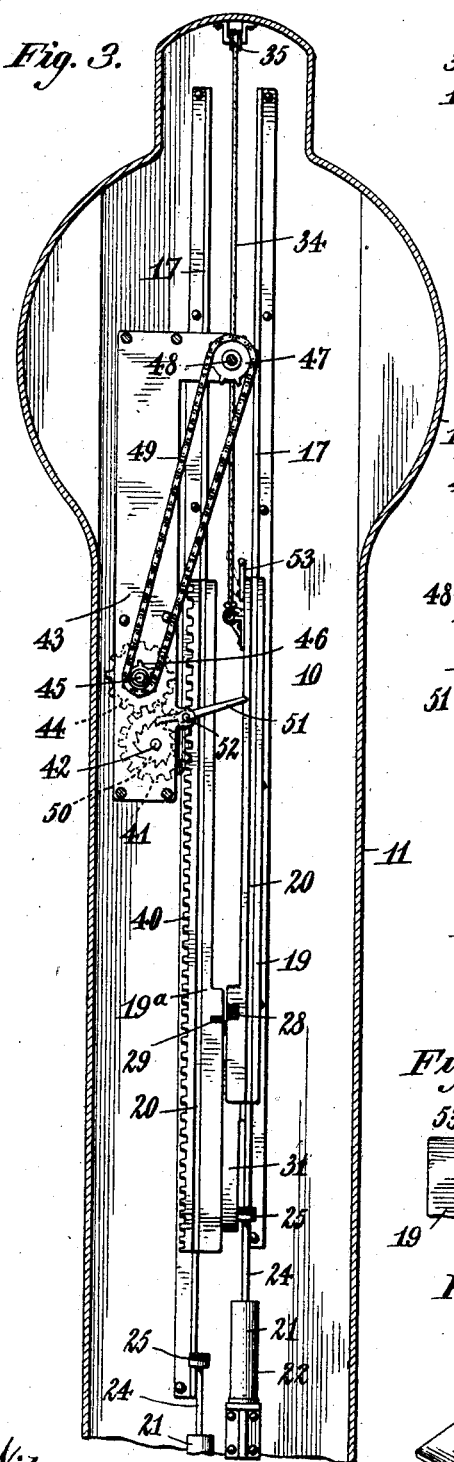
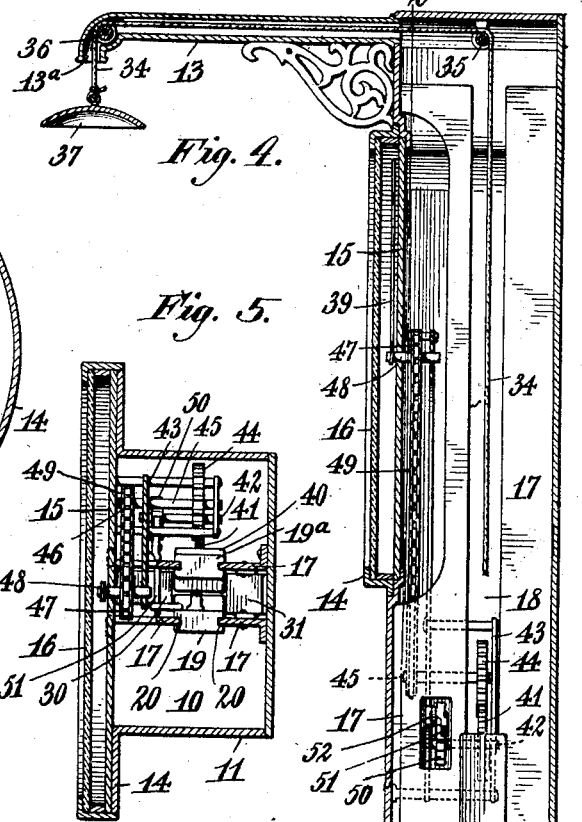
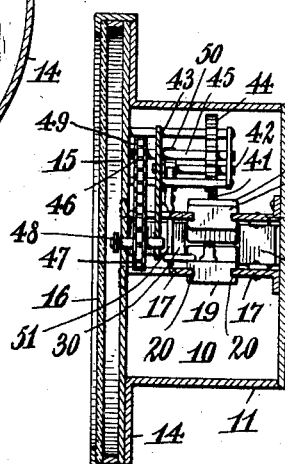
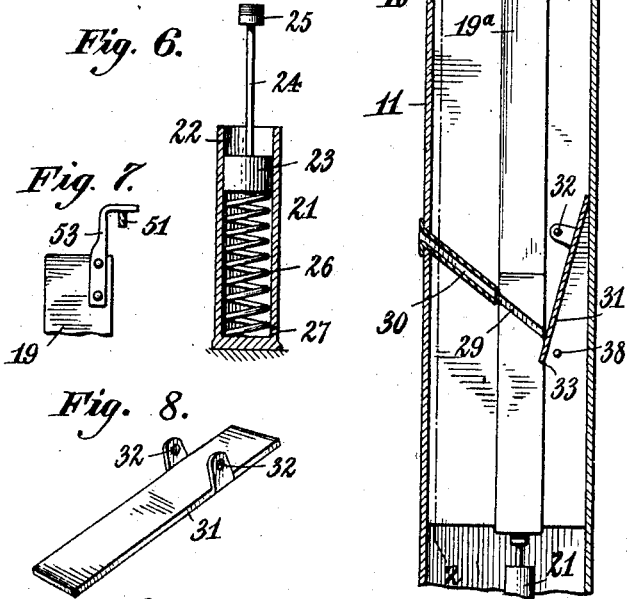
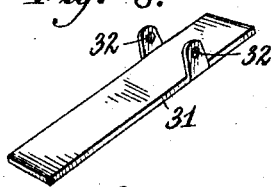
Witnesses:
Julius Lankes
Harry Harris.
Sylvester P. Cottrell, Inventor.
By Emil Neukart,
Attorney.

UNITED STATES PATENT OFFICE.

SYLVESTER P. COTTRELL, OF BUFFALO, NEW YORK, ASSIGNOR TO MARGARET E. COTTRELL, OF BUFFALO, NEW YORK.

MACHINE FOR MEASURING THE HEIGHT OF PERSONS.

No. 833,124.  Specification of Letters Patent.  Patented Oct. 9, 1906.

Application filed January 30, 1905. Serial No. 243,322.

*To all whom it may concern:*

Be it known that I, SYLVESTER P. COTTRELL, a citizen of the United States, residing at Buffalo, in the county of Erie and State of New York, have invented certain new and useful Improvements in Machines for Measuring the Height of Persons, of which the following is a specification.

This invention relates to automatic measuring-machines for indicating the height of persons, but more particularly to that class of machines in which the operating mechanism thereof is normally locked against action and can only be liberated by the introduction of a coin of predetermined denomination.

The objects of my invention are to provide a measuring-machine which is simple, reliable, and efficient in the performance of its functions; to provide suitable weights for returning the operating parts to normal; to provide means for locking said weights together on the introduction of a proper coin, and to so arrange said locking means that the weights become unlocked during their return to normal position.

Further objects of this invention are to provide cushioning means to check the descent of the weights, to retain the indicator at the registered height on the scale during the initial return movement of one of said weights, and to provide a construction which cannot become disarranged by ordinary usage.

With these and other objects in view my invention consists in the construction, arrangement, and combination of parts and devices to be hereinafter described and more particularly described in the subjoined claims.

In the drawings, Figure 1 is a perspective view of the machine, showing the manner in which it is used. Fig. 2 is a transverse vertical section of the upper portion of the machine, taken on line 2 2, Fig. 4, the operating parts being shown in their normal positions and the forward guides being omitted. Fig. 3 is a similar section showing the operating parts in an acting position to measure a person standing on the platform. Fig. 4 is a central vertical section taken on line 4 4, Fig. 2, looking to the left. Fig. 5 is a horizontal section taken on line 5 5, Fig. 2. Fig. 6 is an enlarged vertical section through one of the air-cushioning devices. Fig. 7 is an enlarged vertical section taken on line 7 7, Fig. 2. Fig. 8 is an enlarged detached perspective view of the weight lock or detent.

Referring to the drawings in detail, like numerals of reference refer to like parts in the several figures.

The reference-numeral 10 designates the casing in which the operating mechanism is confined, it consisting of a vertical main portion 11, having at its lower end a forwardly-extending platform 12 and at its upper end a similarly-disposed tube 13. Near the upper end of the casing, on the front side thereof, a cylindrical dial portion 14 is located, and in the latter a dial 15, bearing a height-indicating scale, is securely held, a glass cover 16 being provided to protect the dial.

Secured to the rear and front walls of the casing are suitable guides 17, preferably in the form of angle-irons riveted to said walls and arranged in pairs with the guides of each pair secured to opposite walls and separated by an intervening space 18, in which controlling-weights 19 19$^a$ are slidably held. Said weights are by preference provided with vertical grooves 20, into which the guides 17 fit, and thus prevent displacement of said weights. Normally said weights are supported on spring cushioning devices 21, secured to brackets affixed to the casing, or they may be otherwise affixed or supported, if desired. Each cushioning device comprises a cylinder 22, open at its upper end and having a piston 23, provided with a stem 24, which projects from the upper open end of the cylinder, said stem having an enlargement or head 25, faced with leather or other suitable material to deaden the noise occasioned by the weight dropping thereon. Interposed between the bottom of each cylinder and the piston therein is a spiral spring 26, which tends to hold said piston elevated, and in the cylinder, near the bottom thereof, an air-vent 27 is formed to allow the escape of air from the cylinder when the piston is lowered by its coacting weight.

The controlling-weights 19 19$^a$ are provided at their lower ends with opposing enlargements, which are preferably separated by a slight space, and on the opposing faces of these enlargements two alined inclined coin-retaining grooves 28 29 are formed, the groove 28 being formed in the weight 19 and being somewhat wider than the groove 29, which is formed in the weight 19ᵃ; but the lower walls of said grooves are coincident when the weights are in their normal position. Said grooves form a continuation of a coin-chute 30, which is secured to the front wall of the casing and has its inner end in close proximity to the weights.

31 designates a detent or latch which is pivoted to the casing, as at 32, and has its free or lower end in engagement with notches 33, formed on the rear faces of the weights directly beneath the coin-retaining grooves 28 29, the pivot of the detent being so arranged with reference to the lower end of the latter that said end will swing against the weights unless by some means intentionally brought in contact therewith it is forced out of contact.

To the upper end of the weight 19 a rope 34 or other flexible object is attached, it passing up over a pulley 35, secured to the top of the casing, thence through the tube 13 at the upper end of the latter and over a pulley 36 in said tube. The end of said rope projects through the downwardly-curved open end 13ᵃ of the tube and has attached thereto a concave gage or cap 37, which is to be drawn down and rest upon the head of the person whose height is to be measured, said gage being retained in its elevated position by the weight 19. It is to be understood, however, that the parts are locked against movement by the detent 31, previously referred to, and that said detent does not become disengaged from the controlling-weights 19 19ᵃ until a coin of proper denomination is inserted into the coin-chute. When this is done, the coin enters the inclined coin-retaining grooves 28 29 in the weights and in its descent through said chute and its entrance into said grooves strikes the detent and forces the same out of engagement with the notches 33 in the weights. The movement of the detent is limited by a stop 38 and need not be more than just sufficient to clear the weight. The space between the detent and the inner ends of the coin-retaining grooves is therefore very small, and said detent still serves to retain the coin within the coin-grooves even though it is swung free of the weights. The gage or cap may now be drawn down onto the head of the person whose height is to be measured, the weights being free to move, and as the coin within the coin-retaining grooves locks the two weights together both weights are elevated even though only one is connected to the rope 34. On elevating the weights the indicating-arm, (designated by the numeral 39,) which in conjunction with the dial 15 forms an indicating device, is designed to traverse said dial to indicate the height of the person, the means for actuating the indicating-arm being interposed between the latter and the weight 19ᵃ.

The weight 19ᵃ is provided with a gear-rack 40, which is in mesh with a gear-wheel 41, secured to a shaft 42, which is journaled in a frame 43, secured to the front wall of the casing. A gear-wheel 44 meshes with the gear-wheel 41 and is secured to a shaft 45, likewise journaled in said frame. Secured to said shaft 45 is a sprocket-wheel 46, over which and a sprocket-wheel 47, secured to the indicator-shaft 48, a sprocket-chain 49 passes. The indicating-arm 39 is secured to the indicator-shaft and is caused to traverse the indicator-dial on the raising and lowering of the controlling-weight 19ᵃ.

On the shaft 42 is secured a ratchet-wheel 50, which is engaged by a lock-lever 51, pivoted between its ends, as at 52, to the frame 43 and having its free end extending to the weight 19. The latter is provided with a trip-arm 53, adapted to actuate said lock-arm on its upward and on its downward movement, thereby preventing retrograde movement of the indicating-arm and the return of the weight 19ᵃ until the weight 19 approaches the end of its return movement.

Normally the parts are in the position shown in Fig. 2, the trip-arm 53 being in contact with the free end of the lock-lever 51 to hold the same disengaged from the ratchet-wheel. On introducing a coin of proper denomination into the coin-chute the detent or latch 31 is disengaged from the weights and liberates the same, the coin introduced locking the weights together. The gage or cap 37 is now drawn down and by reason of its connection to the weight 19 causes the latter and the weight 19ᵃ locked thereto to be elevated together, which action causes the trip-arm 53 to become disengaged from the lock-lever 51 to permit the latter to engage the ratchet-wheel 50. The weight 19ᵃ on being elevated causes the indicating-arm 39 to traverse the indicating-disk to an extent corresponding to the movement of the gage 37, and during such action the teeth of the ratchet-wheel move forward under the locking end of the lock-lever 51, which thus engages the successive teeth of said wheel and prevents retrograde movement of the same, consequently preventing return movement of the weight 19ᵃ, which is held in its elevated position until the gage 37 is released and the weight 19 approaches its normal position. When releasing the gage 37, the coin held in the coin-retaining grooves is released and drops to the bottom of the casing. This is caused by reason of the groove 19 being wider than the groove in the weight 19ᵃ and the pressure against the coin being removed on a slight downward movement of the weight 19, which allows the coin to slide out of the grooves. When the weight 19 approaches the end of its downward movement, the trip-arm 53 engages the lock-lever 51 and disengages the same from the ratchet-wheel 50, which allows the weight 19ª to gravitate and cause the indicating mechanism to return to normal.

This invention is susceptible to many changes in form, construction, and arrangement of parts without departing from the spirit of my invention or sacrificing any of the advantages thereof.

Having thus described my invention, what I claim is—

1. In a machine for measuring height, the combination with a vertically-movable gage, of retaining means to hold said gage elevated, locking means engaging said retaining means to lock the latter against movement, means providing for the introduction of an object into the machine to release said locking means from said retaining means, a height-indicating device, and mechanism between the retaining means and the indicating device for actuating the latter on movement of the vertically-movable gage.

2. In a machine for measuring height, the combination with a movable gage, of a vertically-movable weight attached to said gage, an indicating device, mechanism embodying a weight and adapted to actuate the indicating device, and means to permit the introduction of a coin between said weights to lock the same together and cause both weights to be elevated on movement of the gage.

3. In a machine for measuring height, the combination with a casing having a coin-chute and a forwardly-projecting tube at its upper end, a gage located at the outer end of said tube, a vertically-movable weight in the casing having connection with said gage, an indicating device, mechanism between said indicating device and said weight, and means to cause said mechanism and said weight to be operatively connected by a coin introduced into the coin-chute.

4. In a machine for measuring height, the combination with the casing having a coin-chute, a gage located outside of the casing, a vertically-movable weight within the casing connected with said gage and having an inclined groove in line with the coin-chute, a second weight having an inclined groove opposite the groove in the first-mentioned weight, said grooves being adapted to receive a coin to lock the weights together, an indicating device, and operative connection between the second-mentioned weight and the indicating device.

5. In a machine for measuring height, the combination with the casing having a coin-chute, of a gage located outside of the casing, two weights guided for vertical movement, a flexible connection between one of said weights and the gage, an indicating device, operative connection between the other of said weights and the indicating device, and means to cause said weights to travel together on the introduction of a coin into the coin-chute.

6. In a machine for measuring height, the combination with a casing having a coin-chute, of a gage located outside of said casing, two weights within the casing guided for vertical movement, means for locking said weights against movement, a flexible connection between one of said weights and the gage, an indicating device, operative connection between the other of said weights and the indicating device, means to liberate said weights for movement on the introduction of a coin into the coin-chute, and means for locking said weights together with said coin.

7. In a machine for measuring height, the combination with the casing having a coin-chute, two weights within the casing guided for vertical movement and having grooves in their opposing faces in line with the coin-chute, a gage located outside of the casing and being flexibly connected with one of said weights, a gear-rack formed on the other of said weights, an indicating device, and suitable gearing between the gear-rack and the indicating device, the whole being rendered operative on inserting a coin within the grooves in said weights.

8. In a machine for measuring height, the combination with the casing having a coin-chute, of two weights separated by a space and being guided for vertical movement in the casing, said weights having coin-retaining grooves in their opposing faces and one of said grooves being wider than the other, an indicating device, a gage outside of the casing, a flexible connection between said gage and one of said weights, and operative connection between the indicating device and the other of said weights, the whole being rendered operative on the insertion of a coin into the grooves in said weights, said coin being released during the initial portion of the downward movement of the weight connected to the gage.

9. In a machine for measuring height, the combination with the casing, of a gage located outside of said casing, two weights located within the casing and being guided for vertical movement, a cushioning device beneath each weight to check the descent of the same, an indicating device, operative connection between the indicating device and one of said weights, and means to permit both weights to be elevated on the introduction of an object between the weights to lock the latter together.

10. In a machine for measuring height, the combination with the casing having a coin-chute, of a gage located outside of the casing, a vertically-movable weight connected with said gage, a second weight also vertically movable within the casing, said weights having means to cause them to be locked together by a coin introduced into the coin-chute, an indicating device, operative connection between the indicating device and said second weight, and means for holding said second weight elevated until the first-mentioned weight approaches the end of its return movement.

11. In a machine for measuring height, the combination with the casing having a coin-chute, of a gage located outside of the casing, a weight within the casing guided for vertical movement and being flexibly connected with said gage, a second weight having a gear-rack and located in close proximity to said first-mentioned weight, said weights having grooves in their opposing faces to receive a coin for locking the weights together, an indicating device, gearing connecting the gear-rack on said second weight with the indicating device and being adapted to revolve on elevating the last-mentioned weight, and detention means for preventing retrograde movement of said gearing and the return movement of said second weight, said detention means comprising a ratchet and a lock-lever engaging said ratchet and having its free end lying in the path of the first-mentioned weight.

12. In a machine for measuring height, the combination with the casing having a coin-chute, of a gage located outside of said casing, two weights guided for vertical movement within the casing and having grooves in their opposing faces in line with the coin-chute, said weights having also notches on their rear faces beneath said grooves, a detent having its free end engaging said notches to prevent movement of said weights and being adapted to be forced out of engagement with said notches by a coin entering said grooves, an indicating device, a flexible connection between the gage and one of said weights, and operative connection between the indicating device and the other of said weights.

13. In a machine for measuring height, the combination with the casing having a coin-chute, of a gage located outside of said casing, two weights guided for vertical movement within the casing and having grooves in their opposing faces in line with the coin-chute, said weights having also notches on their rear faces beneath said grooves a detent having its free end engaging said notches to prevent movement of said weights and being adapted to be forced out of engagement with said notches by a coin entering said grooves, a stop limiting the movement of the detent to prevent dislodgment of the coin from said grooves, an indicating device, a flexible connection between the gage and one of said weights, and operative connection between the indicating device and the other of said weights.

14. In a machine for measuring height, the combination with a casing having an inclined coin-chute, a gage located outside of the casing, two weights guided for vertical movement within the casing and having inclined grooves in their opposing faces in line with the coin-chute and adapted to receive a coin inserted into the coin-chute, the groove in one of said weights being wider than the groove in the other weight, both grooves having their lower inclined walls coincident, when said weights are in their normal inoperative position, a flexible connection between the gage and one of said weights, an indicating device, operative connection between the indicating device and the other of said weights, means for holding the last-mentioned weight elevated when measuring height until the other of said weights approach the end of its return movement, substantially as and for the purpose set forth.

In testimony whereof I have affixed my signature in the presence of two subscribing witnesses.

SYLVESTER P. COTTRELL.

Witnesses:
JULIUS LANKES,
EMIL NEUHART.